(12) United States Patent
Viala

(10) Patent No.: US 12,264,223 B2
(45) Date of Patent: Apr. 1, 2025

(54) METHOD FOR MANUFACTURING A COMPOSITE MATERIAL COMPRISING A POLYMER AND NANOMATERIALS

(71) Applicant: COMMISSARIAT À L'ÉNERGIE ATOMIQUE ET AUX ÉNERGIES ALTERNATIVES, Paris (FR)

(72) Inventor: Bernard Viala, Grenoble (FR)

(73) Assignee: COMMISSARIAT À L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 133 days.

(21) Appl. No.: 17/648,997

(22) Filed: Jan. 26, 2022

(65) Prior Publication Data

US 2022/0235183 A1 Jul. 28, 2022

(30) Foreign Application Priority Data

Jan. 28, 2021 (FR) ...................... 2100814

(51) Int. Cl.
| | |
|---|---|
| *C08J 3/215* | (2006.01) |
| *C08K 3/04* | (2006.01) |
| *C08K 3/38* | (2006.01) |
| *C08K 9/02* | (2006.01) |
| *H01F 1/147* | (2006.01) |

(52) U.S. Cl.
CPC ................. *C08J 3/215* (2013.01); *C08K 3/04* (2013.01); *C08K 3/38* (2013.01); *C08K 9/02* (2013.01); *H01F 1/147* (2013.01); *C08J 2325/06* (2013.01); *C08J 2327/16* (2013.01); *C08J 2333/10* (2013.01); *C08J 2363/00* (2013.01); *C08J 2379/08* (2013.01); *C08K 2003/385* (2013.01); *C08K 2201/001* (2013.01); *C08K 2201/01* (2013.01); *C08K 2201/011* (2013.01)

(58) Field of Classification Search
CPC ... C08K 3/04; C08K 3/38; C08K 9/02; C08K 2003/385; C08J 3/215; C08J 2325/16; C08J 2327/16; C08J 2333/10; C08J 2363/10; C08J 2379/08
See application file for complete search history.

(56) References Cited

U.S. PATENT DOCUMENTS

| | | | |
|---|---|---|---|
| 6,759,452 B2 * | 7/2004 | Border ................... | B82Y 30/00 524/425 |
| 8,475,879 B1 * | 7/2013 | Borjanovic ............. | B64G 1/54 427/902 |
| 9,120,908 B2 * | 9/2015 | Russ ....................... | C08K 3/04 |
| 2002/0120048 A1 * | 8/2002 | Border .................... | C08K 3/26 524/436 |
| 2010/0027192 A1 * | 2/2010 | Perry ...................... | C01G 1/02 977/773 |
| 2012/0071682 A1 | 3/2012 | Korampally et al. | |
| 2013/0168598 A1 | 7/2013 | Xiong et al. | |
| 2013/0171352 A1 | 7/2013 | Xiong et al. | |
| 2013/0171359 A1 | 7/2013 | Xiong et al. | |
| 2017/0152439 A1 * | 6/2017 | Lian ....................... | A01N 59/16 |
| 2021/0032533 A1 | 2/2021 | Le Blevennec et al. | |

FOREIGN PATENT DOCUMENTS

| | | | | |
|---|---|---|---|---|
| FR | 3074495 A1 | 6/2019 | | |
| WO | 2009103070 A1 | 8/2009 | | |
| WO | WO 2019097445 A1 * | 5/2019 | ............... | C08J 9/00 |

OTHER PUBLICATIONS

Search Report for French application No. FR2100814 dated Sep. 29, 2021.

* cited by examiner

*Primary Examiner* — Jane L Stanley

(74) *Attorney, Agent, or Firm* — Chrisman Gallo Tochtrop LLC

(57) ABSTRACT

Method for manufacturing a composite material comprising a polymer and nanomaterials, the method comprising the following steps: dissolution of the polymer in a first solvent, whereby a first solution is obtained, dispersion of the nanomaterials in a second solvent, different from the first solvent, whereby a second solution is obtained, mixing of the two solutions, whereby a third solution is obtained, heating of the third solution so as to evaporate the second solvent, whereby a final solution is obtained, deposition of the final solution on a substrate and evaporation of the first solvent, the second solvent having a boiling point lower by at least 30° C. than that of the first solvent, and the viscosity of the final solution being equal to some 10% of the viscosity of the first solution.

17 Claims, No Drawings

METHOD FOR MANUFACTURING A COMPOSITE MATERIAL COMPRISING A POLYMER AND NANOMATERIALS

CROSS-REFERENCE TO RELATED APPLICATIONS

This application claims priority from French Patent Application No. 2100814 filed on Jan. 28, 2021. The content of this application is incorporated herein by reference in its entirety.

TECHNICAL FIELD

The present invention pertains to the general field of composite materials comprising a polymer and nanomaterials, for example nanoparticles.

The invention relates to a method for manufacturing such a composite material.

The invention finds applications in numerous industrial fields, and notably for the manufacture of dielectrics for capacitances, for the manufacture of magnetic materials for inductances, or instead for the manufacture of surface coatings.

The invention is particularly interesting since it makes it possible to obtain homogeneous composite materials.

PRIOR ART

At present, to form a composite material comprising a polymer and nanomaterials, for example nanoparticles, a first solution containing a first solvent and a polymer and a second solution (dispersion) containing a second solvent and the nanoparticles are prepared. The two solutions are mixed, then the resulting solution is deposited on a substrate or is injected into a mould.

The concentration of polymer is an essential parameter because it determines to the first order the viscosity of the final solution. It thus plays an essential role in the quality of the deposition.

Yet, when the second solution containing the nanomaterials is added to the solution containing the polymer, a decrease in the concentration of the polymer is caused automatically, which modifies the viscosity of the solution. For example, if the concentration of polymer is reduced twofold, this can decrease the viscosity tenfold. It will then be difficult to deposit the composite material correctly (not thick enough, lack of material, poor uniformity, etc.).

In order to overcome this drawback, several solutions could be envisaged.

The first solution consists in adding a powder of nanomaterials directly in the solution containing the polymer. But, such as action usually leads to the formation of aggregates. That is why the nanomaterials are dispersed in a suitable solvent before being used.

Conversely, a polymer powder or polymer granules could be added directly in the dispersion of nanomaterials with the correct proportion to obtain the desired viscosity. But, such an action usually leads to sedimentation of the nanoparticles at the bottom of the flask before complete dissolution of the polymer powder or granules because the dissolution time of the polymers (for example several hours) is in general much longer than the sedimentation time of the nanomaterials (for example of the order of ten or so minutes for magnetic nanoparticles). Otherwise, the polymer would not be totally dissolved.

Another solution consists in drying the dispersion of nanomaterials by evaporating the solvent that has served to disperse them. The dry product may next be recovered to be added to the polymer solution. But the action of drying the dispersion of nanoparticles in general leads to their re-agglomeration. Indeed, it is known that there are solvents that are more favourable to the dispersion of certain nanomaterials than others: the solvent used to dissolve the polymer (generally chosen as a function of the deposition technique and/or the targeted application) is not necessarily a good solvent for the dry residue. The nanomaterials are then not dispersed in a homogeneous manner. The resulting mixture can, for example, have a supernatant on the surface or sediments at the bottom of the flask.

There is thus, at present, no satisfactory solution for preparing a solution, homogeneous and having the suitable viscosity, in order to manufacture a composite material.

DESCRIPTION OF THE INVENTION

One aim of the present invention is to propose a method overcoming the drawbacks of the prior art and, in particular, a method making it possible to form a homogeneous composite material, the method having to be simple to implement.

To do so, the present invention proposes a method for manufacturing a composite material comprising a polymer and nanomaterials, the method comprising the following steps:

a) dissolution of the polymer in a first solvent, whereby a first solution is obtained, b) dispersion of the nanomaterials in a second solvent, different from the first solvent, whereby a second solution is obtained, c) mixing of the two solutions, whereby a third solution is obtained, d) heating of the third solution so as to evaporate at least 10% by volume of the second solvent, and preferably so as to evaporate totally the second solvent, whereby a final solution is obtained, e) deposition of the final solution on a substrate or injection of the final solution into a mould and evaporation of the first solvent, and potentially evaporation of the volume fraction of the second solvent not evaporated during step d), the second solvent has a boiling point lower by at least 30° C. than the boiling point of the first solvent, and the viscosity of the final solution is equal to some 20% and, preferably, is equal to some 10% of the viscosity of the first solution.

The invention is fundamentally distinguished from the prior art by the use of two distinct solvents, having different boiling points. The change of solvent is carried out while remaining all the time in liquid medium, that is to say without going through an intermediate drying step, which in fine ensures the correct dispersion of the nanomaterials in the final solution.

It is thus possible, firstly, in parallel to dissolve the polymer easily in the first solution and to disperse the nanomaterials easily in the second solution, then, following mixing of the two solutions and the preferential evaporation of the second solvent, to deposit easily the final solution, which has a suitable viscosity and a correct dispersion of the nanomaterials, which leads to the formation of a homogeneous composite material.

Advantageously, the second solvent has a boiling point lower by at least 50° C. than that of the first solvent.

Advantageously, the first solvent has a boiling point above 100° C. and the second solvent has a boiling point below 90° C. Solvents with low boiling point (below 90° C. or even below 70° C.) are not, in general, used as application solvent because they dry too quickly and do not make it possible to deposit a continuous film correctly on a substrate or to fill integrally a mould. In practice, the solution dries before being completely spread or dispensed, which leads to a material of poor quality. However, the use of such a solvent is particularly advantageous within the scope of the invention.

Advantageously, the first solvent is chosen from among propylene glycol monomethyl ether acetates (PGMEA), ethyl lactates (EEP, ethyl 3-ethoxy propionate), xylene, anisole and cyclopentanone. These solvents generally have high boiling points (130° C. to 190° C.).

Advantageously, the second solvent is chosen from acetone, benzene, butanone, ethyl acetate, hexane, 2-propanol, chloroform, dichloroethane and dichloromethane.

Advantageously, the first solvent is PGMEA and the second solvent is a chlorinated solvent, such as chloroform.

Advantageously, the polymer is chosen from among a polystyrene, a polyepoxide, a poly(vinylidene fluoride), a polymethacrylate and a polyetherimide.

According to a first advantageous alternative embodiment, the nanomaterials are chosen from among nanoparticles.

The nanoparticles may be nanoparticles with core-shell structure, for example, formed of a metal core based on Cu, Ni, Co or Fe, coated with a layer of carbon.

The nanoparticles may be magnetic.

The nanoparticles may be ferroelectric.

The nanomaterials may be wide gap semiconductors.

According to another advantageous alternative embodiment, the nanomaterials are chosen from among nanosheets of hexagonal boron nitride (h-BN) and nanodiamonds.

Advantageously, the second solvent is a chlorinated solvent and the nanomaterials are nitride-containing or carbon-containing. The nanomaterials may be nitride-containing or carbon-containing in their mass (core) or only on their surface (shell), or both.

Advantageously, step b) is carried out under ultrasounds. A homogeneous mixture is obtained.

The method has numerous advantages:
compared to the prior art, there is no intermediate drying step, which simplifies the method and limits the risks of re-agglomeration of the nanomaterials at the intermediate drying step,
the viscosity of the final solution is unchanged or similar to that of the first solution,
the nanomaterials are better dispersed in the polymer,
the thickness, the uniformity and the homogeneity of the material deposited or moulded are better controlled,
the physical properties of the deposited films are improved; for example, since dielectric or magnetic losses are dependent on the dimensions of the aggregates, the quality factors of the materials obtained with this method are increased. It is thus possible to obtain high performance components, such as capacitances and inductances.

Other characteristics and advantages of the invention will become clear from the additional description that follows.

It goes without saying that this additional description is only given to illustrate the subject matter of the invention and must not in any case be interpreted as a limitation of this subject matter.

DETAILED DESCRIPTION OF PARTICULAR EMBODIMENTS

The method for manufacturing a composite material comprising a polymer and nanomaterials comprises the following steps:

a) dissolution of the polymer in a first solvent, whereby a first solution is obtained, b) dispersion of the nanomaterials in a second solvent, different from the first solvent, whereby a second solution is obtained (also called dispersion), the second solvent has a boiling point lower by at least 30° C. than that of the first solvent, c) mixing of the two solutions, whereby a third solution is obtained, d) heating of the third solution so as to evaporate at least 10% by volume of the second solvent, and preferably so as to evaporate totally the second solvent, whereby a final solution is obtained, the viscosity of the final solution is equal to some 20% of the viscosity of the first solution, preferably to some 10% of the viscosity of the first solution and even more preferentially to some 5% of the viscosity of the first solution, e) deposition of the final solution on a substrate or injection of the final solution into a mould and evaporation of the first solvent, and optionally of the part of the second solvent not evaporated during step d).

Equal to some 10% is taken to mean that the viscosity value of the final solution does not vary by more than 10% from the viscosity value of the first solution.

During step a), a polymer is dissolved in a solvent.

The first solvent is, preferably, an organic solvent.

It is, for example, a solvent used with lithography resins or screen printing inks such as PGMEA, EEP, xylene, anisole or cyclopentanone. For example, the density of PGMEA is 0.96 with a boiling point: $P_B=146°$ C.

Alternatively, the first solvent could be water.

The first solvent has a high boiling point (preferably above or equal to 100° C. and even more preferentially strictly above 100° C.).

The solvent serves both to dissolve and to dilute the polymer. It is the concentration of polymer in the first solvent that determines the viscosity of the first solution.

The polymer may be a photosensitive or electroactive polymer.

The polymer is, preferably, chosen from among polystyrenes (PS), polyepoxides, poly(vinylidene fluorides) (PVDF, P(VDF-TerFe), P(VDF-TerFe-CTFE or CFE), a polymethacrylate (PMMA) and a polyetherimide (PEI).

Several polymers may be used in mixing.

The viscosity of the first solution is, for example, comprised between 1000 and 10000 cP at 25° C.

During step b), the nanomaterials are dispersed in the second solvent. It is possible to carry out this step using ultrasounds.

The second solvent is an organic solvent.

The second solvent has a low boiling point (preferably strictly below 90° C.).

The second solvent is, for example, acetone, benzene, butanone, ethyl acetate, hexane, 2-propanol, chloroform, dichloroethane and dichloromethane.

Chlorinated solvents such as chloroform, dichloroethane and dichloromethane are particularly interesting with carbon-containing or nitride-containing nanomaterials such as carbon nanotubes, carbon black, nanoparticles coated with a layer of carbon, nanosheets of boron nitride, etc.

Advantageously, ultra-sonication, used to disperse the nanomaterials, causes a partial decomposition of chloroform which frees chlorine radicals which are going to be able to graft for example onto the carbon nanotube surface through non-covalent bonds. Chlorine being a large molecule, it can be grafted onto the nanomaterials and generate steric hindrance (analogous to surfactants) and to help to separate them, which maintains them longer in suspension (increased sedimentation time).

The nanomaterials may be 1D, 2D or 3D nanomaterials.

The nanomaterials are, for example, nanoparticles. They may be nanoparticles formed of noble metals, non-noble metals, or magnetic materials, semiconductor materials, metal oxides, or ferroelectric materials, etc.

Preferably, nanoparticles with core-shell structure will be chosen. The core, for example metal, is coated by a layer of carbon or a layer of oxide, notably made of silica or alumina.

Preferably, the core is based on Cu, Ni, Co or Fe and the shell is made of carbon, and notably constituted of several sheets of graphene. It may also be made of amorphous carbon or graphite.

The nanomaterials may also be nanosheets of hexagonal boron nitride (h-BN) or instead nanodiamonds.

Several types of nanomaterials may be used in mixing.

The concentration of the suspension of nanomaterials is, advantageously, between 0.01 and 0.2 g/mL, for example 0.1 g/mL.

The concentration of nanomaterials in suspension in the second solvent is chosen so as to have a final solution having the correct quantity of nanomaterials/quantity of polymer ratio to obtain the desired concentration of nanomaterials in the dry polymer (after evaporation of the solvents).

The presence of nanomaterials in suspension in a solvent does not significantly modify its viscosity (it is considered that it is unchanged).

During step c), the first solution and the second solution are mixed.

A nanocomposite solution is obtained formed of a suspension of nanomaterials in a liquid polymer matrix with a predetermined quantity of nanomaterials over quantity of polymer ratio.

After mixing, the viscosity of the solution decreases on account of the dilution of the polymer. The viscosity of the solution after mixing is, for example, between 1 and 10 cP at 25° C.

The first solvent and the second solvent are advantageously miscible.

Preferably, the first solvent is PGMEA and the second solvent is a chlorinated solvent. Chloroform is a denser solvent (1.48) than PGMEA, capable of keeping the nanomaterials in suspension longer, and having a much lower boiling point: $P_B=61°$ C.

Preferably, PGMEA and chloroform will be chosen.

During step d), the third solution is heated. This solution is heated to a temperature in the vicinity of the boiling temperature of the second solvent and below the boiling temperature of the first solvent. In the vicinity is taken to mean±20° C., and preferably ±10° C.

It is possible to heat the second solvent above the boiling temperature.

It is also possible to heat from 0 to 20° C., and preferably from 0 to 10° C., below the boiling temperature of the second solvent to avoid the formation of bubbles.

A partial or total evaporation of the second solvent is thus brought about. Partial evaporation is taken to mean that at least 10%, 20%, 30% 40%, 50%, 60%, 70%, 80% or 90% by volume are evaporated.

As an illustration, the following table lists the viscosities of different solutions at the end of step d), as a function of the volume fraction of the second solvent that has been evaporated.

| Evaporation of the second solvent (% vol.) | 0 | 20 | 50 | 100 |
|---|---|---|---|---|
| Viscosity at 25 °C. (cP) | 1-10 | 10-100 | 100-1000 | 1000-10000 |

The totality (100% by volume) or even the quasi-totality (at least 95% by volume) of the first solvent is conserved (it is considered that residual evaporation is negligible). Several minutes suffice to evaporate the second solvent.

After evaporation, preferably complete, of the second solvent, a homogeneous nanocomposite solution is obtained. The final solution has the correct viscosity to be deposited and to form a homogeneous composite material. The solvent of this solution is the first solvent, which is the application solvent.

During step e), the final nanocomposite solution is deposited on a substrate. This nanocomposite solution may be used, advantageously, for the deposition of a film, for example using a spin coater, or for the moulding of a wafer, for example by hot pressing or by injection into a mould. The film or the wafer will next be dried in the vicinity of the boiling temperature of the first solvent in order to eliminate it.

A homogeneous composite material comprising a polymer and nanomaterials (1D, 2D or 3D) is thus obtained.

Although it is in no way limiting, the invention particularly finds applications in the field of capacitances (using as dielectric a polymer with nanomaterials) and inductances (using as magnetic material a polymer with magnetic nanoparticles).

The invention also finds applications in the field of surface coatings (anti-wear, hydrophobic, optic, etc.). Depending on the nanomaterials chosen, it is in fact possible to modify the hardness of a resin, or the optical index of a coating.

What is claimed is:

1. Method for manufacturing a composite material comprising a polymer and nanomaterials, the method comprising the following steps:
   a) dissolution of the polymer in a first solvent, whereby a first solution is obtained,
   b) dispersion of the nanomaterials in a second solvent, different from the first solvent, whereby a second solution is obtained,
   c) mixing of the two solutions, whereby a third solution is obtained,
   d) heating of the third solution so as to totally evaporate the second solvent, whereby a final solution is obtained,
   e) deposition of the final solution on a substrate or injection of the final solution into a mould and evaporation of the first solvent,
   wherein the second solvent has a boiling point lower by at least 30° C. than that of the first solvent, and
   and wherein the viscosity of the final solution is about 20% of the viscosity of the first solution.

2. Method according to claim 1, wherein the second solvent has a boiling point lower by at least 50° C. than that of the first solvent.

3. Method according to claim 1, wherein the first solvent has a boiling point above 100° C. and the second solvent has a boiling point below 90° C.

4. Method according to claim 1, wherein the first solvent is chosen from among propylene glycol methyl ether acetates, ethyl lactates, xylene, anisole and cyclopentanone.

5. Method according to claim 1, wherein the second solvent is chosen from among acetone, benzene, butanone, ethyl acetate, hexane, 2-propanol, chloroform, dichloroethane and dichloromethane.

6. Method according to claim 1, wherein the first solvent is propylene glycol methyl ester acetate (PGMEA) and the second solvent is chloroform.

7. Method according to claim 1, wherein the polymer is chosen from among polystyrenes, polyepoxides, poly(vinylidene fluorides), polymethacrylates and polyetherimides.

8. Method according to claim 1, wherein the nanomaterials are nanoparticles with core-shell structure.

9. Method according to claim 8, wherein the nanoparticles are nanoparticles formed of a metal core based on Cu, Ni, Co or Fe, coated by a layer of carbon.

10. Method according to claim 1, wherein the nanomaterials are magnetic or ferroelectric.

11. Method according to claim 1, wherein the nanomaterials are wide gap semiconductors.

12. Method according to claim 1, wherein the nanomaterials are chosen from among nanosheets of hexagonal boron nitride (h-BN) and nanodiamonds.

13. Method according to claim 1, wherein the second solvent is a chlorinated solvent and the nanomaterials are nitride-containing or carbon-containing.

14. Method according to claim 1, wherein step b) is carried out under ultrasounds.

15. Method according to claim 1, wherein the second solvent is a chlorinated solvent, the nanomaterials are nitride-containing or carbon-containing and step b) is carried out under ultrasounds.

16. Method according to claim 1, wherein the viscosity of the final solution is about 10% of the viscosity of the first solution.

17. Method for manufacturing a composite material comprising a polymer and nanomaterials, the method comprising the following steps:
   a) dissolution of the polymer in a first solvent, whereby a first solution is obtained,
   b) dispersion of the nanomaterials in a second solvent, different from the first solvent, whereby a second solution is obtained,
   c) mixing of the two solutions, whereby a third solution is obtained,
   d) heating of the third solution so as to evaporate at least 10% by volume of the second solvent, whereby a final solution is obtained,
   e) deposition of the final solution on a substrate or injection of the final solution into a mould and evaporation of the first solvent, and evaporation of the volume fraction of the second solvent not evaporated during step d),
   wherein the second solvent has a boiling point lower by at least 30° C. than that of the first solvent,
   wherein the viscosity of the final solution is about 20% of the viscosity of the first solution, and
   and wherein substantially no portion of the first solvent is evaporated during step d).

* * * * *